Figure 2:
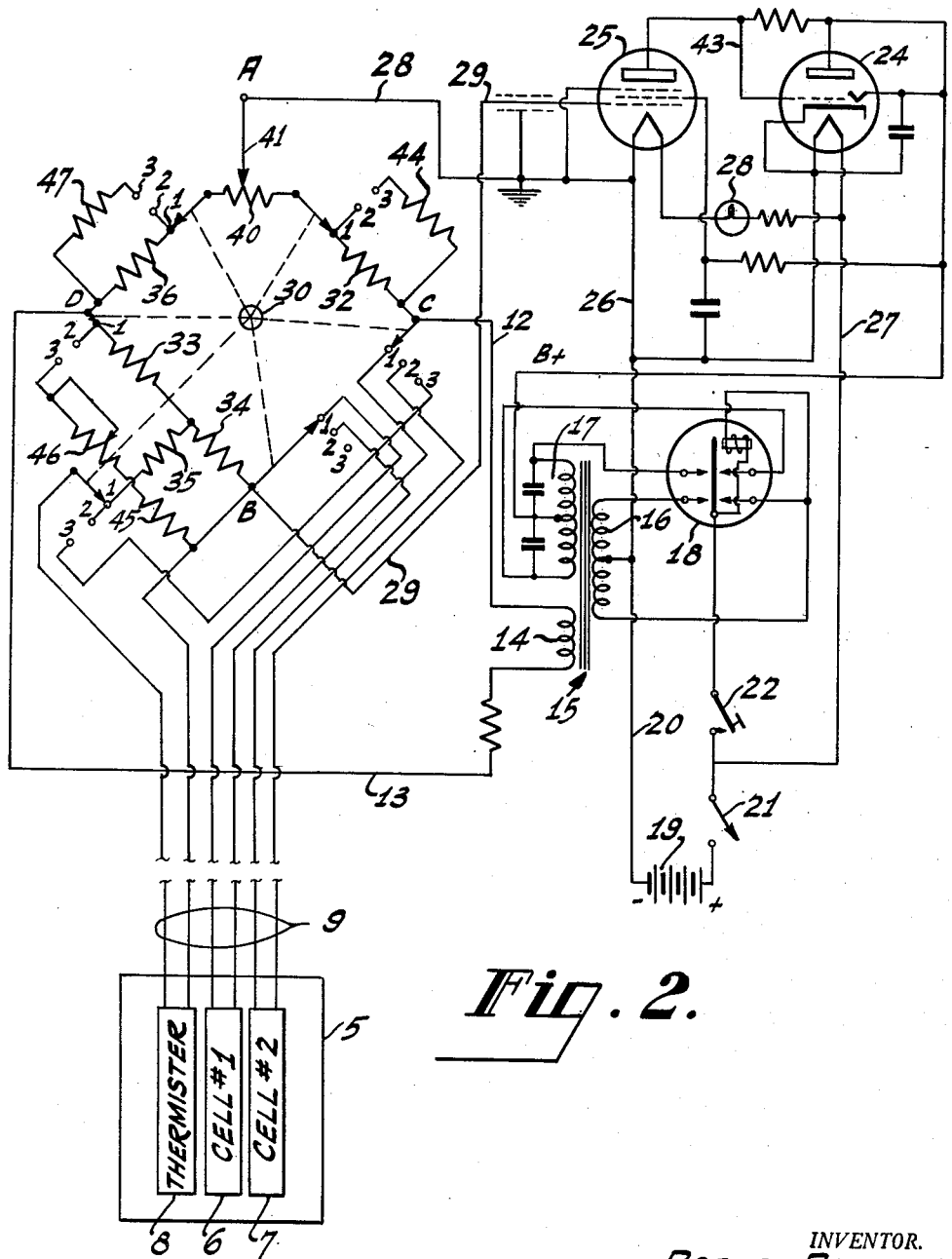

Oct. 2, 1956  R. ROSENTHAL  2,764,892
COMBINATION CONDUCTIVITY AND TEMPERATURE INDICATOR
Filed Oct. 29, 1954  2 Sheets-Sheet 1
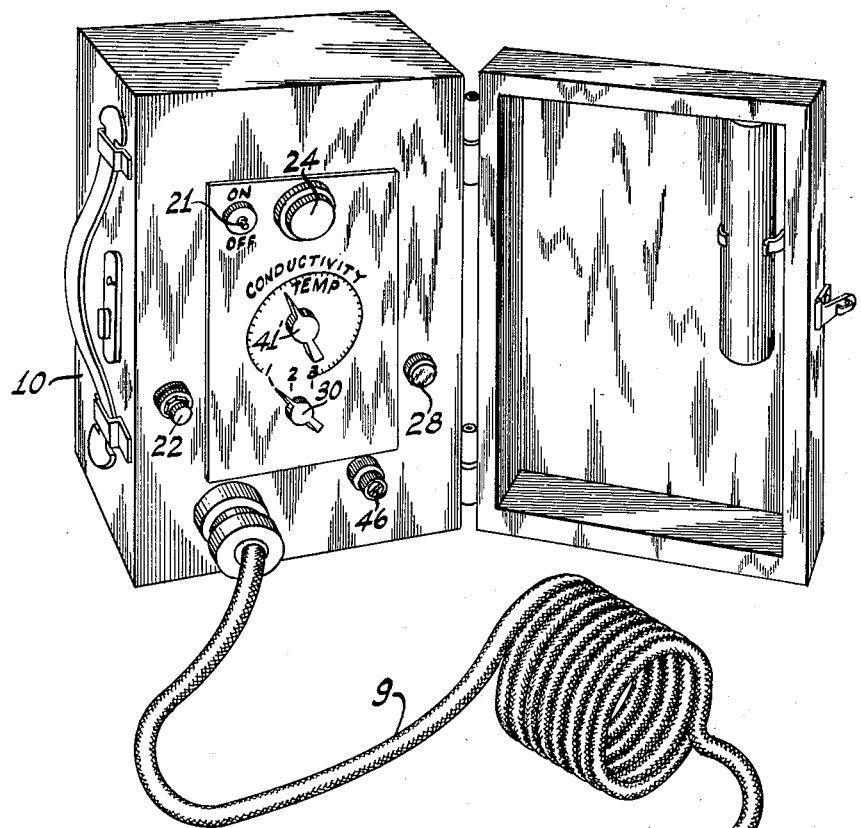
Fig.1.
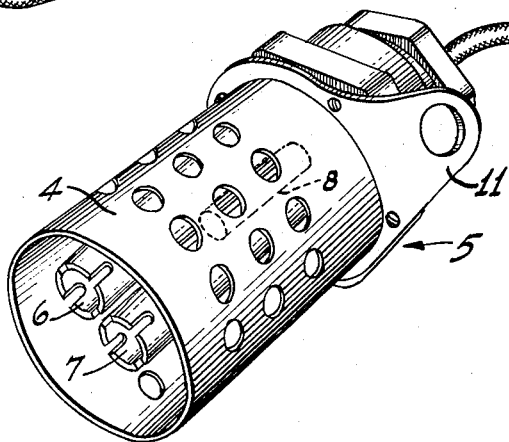
INVENTOR.
ROBERT ROSENTHAL
BY
Charles H. Brown
ATTORNEY INVENTOR.
ROBERT ROSENTHAL
BY
Charles H. Brown
ATTORNEY

United States Patent Office 2,764,892
Patented Oct. 2, 1956

2,764,892

COMBINATION CONDUCTIVITY AND TEMPERATURE INDICATOR

Robert Rosenthal, Tenafly, N. J., assignor to Industrial Instruments, Inc., Cedar Grove, N. J., a corporation of New Jersey Application October 29, 1954, Serial No. 465,529

7 Claims. (Cl. 73—344)

This invention relates to a combination conductivity and temperature indicator, and more particularly to an instrument for measuring the conductivity and the temperature of liquids.

While not limited thereto, the invention is particularly useful in measuring the salinity and temperature of sea water, and fresh water contaminated by sea water. Salinity is frequently measured by measuring the electrical conductivity of the solution. However, the electrical conductivity of a solution varies with temperature and it is necessary to compensate for temperature variations to obtain a correct indication of salinity. An accurate indication of salinity can be obtained by means of a bridge circuit having a conductivity cell connected to one arm of the bridge and having a temperature-responsive resistor such as a thermistor included in another arm of the bridge. The conductivity cell and the thermistor are both mounted in an immersion unit electrically connected to the bridge by means of a multi-conductor cable. The circuit is arranged so that the conductivity (or resistance) of the bridge arm including the thermistor varies with the temperature of the solution in such a way as to balance out the variations in conductivity (or resistance) of the solution due to temperature, and provide an accurate indication of salinity.

When measuring salinity, such as when measuring the salinity of rivers which flow into the sea, it is often desired to also measure the temperature of the water. It is therefore a general object of this invention to provide a single instrument for measuring both the temperature-compensated conductivity of the solution and the temperature of the solution.

It is another object to provide an improved temperature-compensated conductivity indicator and temperature indicator including a common temperature-responsive resistor.

It is a further object to provide an improved self-contained, portable, compact salinity and temperature indicating instrument.

It is a still further object to provide an improved temperature-compensated conductivity indicator by which conductivity can be measured over a very wide range of values.

In one aspect, the invention comprises a bridge circuit having two opposite terminals connected through an amplifier tube to a "magic eye" indicator tube. A battery supplies filament current to the tubes and also energizes a synchronous vibrator which supplies B+ potential to the tubes and alternating current to the other two opposite terminals of the bridge. An immersion unit includes two conductivity cells of different sensitivity and a thermistor, the three devices being individually connected to the bridge by means of a six-conductor cable. The bridge includes a six-pole three-position switch for variously connecting the conductivity cells and the thermistor to the bridge to measure temperature-compensated conductivity in two ranges and to measure temperature. A variable balancing resistor in the bridge is adjusted until a maximum dark segment is provided by the magic eye tube. Calibrated dials associated with the balancing resistor give the salinity and the temperature of the liquid surrounding the immersion unit.

These and other objects and aspects of the invention will be apparent to those skilled in the art from the following more detailed description taken in conjunction with the appended drawings, wherein:

Figure 1 is a perspective view showing the appearance of an instrument constructed according to the teachings of this invention; and Figure 2 is a circuit diagram of the instrument shown in Figure 1.

Figure 1 of the drawing shows the general appearance of a combination conductivity and temperature indicator. An immersion unit generally designated 5 comprises a metallic apertured protective structure 4 enclosing a first conductivity cell 6, a second conductivity cell 7 having a different range, and a thermistor 8. Protective structure 4 is an aluminum cylinder open at one end, as shown, and provided with a plurality of holes in its side wall. Conductivity cells include two spaced electrodes between which the liquid being tested forms a conductive path. The thermistor 8 is a temperature-responsive resistor the resistance of which varies according to the temperature of the liquid in which the immersion unit 5 is immersed. Each of the conductivity cells 6 and 7 and the thermistor 8 have two leads which are connected through a six conductor cable 9 to the cabinet 10 enclosing the bridge circuit. The immersion unit 5 is lowered into the water by means of a rope (not shown) connected to metallic ears 11 on the immersion unit 5. A separate rope is used to avoid any mechanical strain on the electric cable 9.

Reference will now be made to Figure 2 for a description of the electrical circuit within the cabinet 10 of Figure 1. A resistance bridge has a first pair of opposite terminals A and B, and a second pair of opposite terminals C and D. The opposite terminals C and D are energized over leads 12 and 13 from the secondary coil 14 of a transformer 15. The transformer 15 also includes a primary coil 16 and a second secondary coil 17, the coils being connected with contacts of a vibrator 18 to constitute a synchronous vibrator power supply for translating low voltage direct current from a battery to high voltage direct current. Synchronous vibrator power supplies, are described on page 613 of "Radio Engineers Handbook," by Terman, 1943.

The synchronous vibrator power supply is energized from a battery 19. The negative terminal of battery 19 is connected over lead 20 to the center tap on primary coil 16, and the positive terminal of battery 19 is connected through an on-off switch 21 and through a normally opened spring biased push-button switch 22 to the vibrating reed of the vibrator 18. B+ potential is obtained on the B+ lead connected to the center tap on the secondary coil 17. B+ potential is applied to the anode and control electrodes of a visual indicator or magic-eye tube 24, and also to the anode and screen grid of an amplifier vacuum tube 25. Magic eye tubes and circuits are shown at page 320 of the "Radio Engineers Handbook," supra. The filaments of tubes 24 and 25 are energized directly from the battery 19 through the on-off switch 21, and through leads 26 and 27. An indicator light 28 is connected in circuit with the filament of amplifier tube 25 to provide a visual indication of the position of the on-off switch 21. It will be noted that the vibrator 18 is not energized unless the push-button switch 22 is in the closed position. In operation, the switch 22 is closed only when readings are being taken in order to minimize the current drain from the battery 19.

The two opposite terminals A and B of the bridge circuit are connected to the input electrodes of the amplifier tube 25. The terminal A is connected over lead 28 to the filament of amplifier tube 25, and the terminal B is connected over lead 29 to the control grid of the amplifier tube 25. The resistance bridge includes a six-pole three-position switch having a control knob 30. In the drawing, dotted lines extend from the control knob 30 to the six movable contacts represented by arrowheads. There are three stationary contacts designated 1, 2 and 3 associated with each of the movable contacts. In the drawing, all of the movable contacts are positioned in contact with the stationary contacts designated 1. By moving switch knob 30, all of the movable contacts can be shifted to the corresponding positions designated 2, or the corresponding positions designated 3.

When the six-pole three-position switch is in the position shown in the drawing, the bridge arm A—C is constituted by a resistor 32, the bridge arm C—B is constituted by conductivity cell 6 in the immersion unit 5, the bridge arm B—D is constituted by a resistance network including resistors 33, 34, 35, and temperature-responsive resistor or thermistor 8, and bridge arm D—A is constituted by resistor 36. The bridge arms D—A and A—C in addition, include a balancing resistor 40 in varying proportions depending on the position of the sliding contact 41. The sliding contact 41 is controlled by a knob 41' shown in Figure 1.

In the operation of the instrument with the bridge connected as shown in the drawing, the immersion unit 5 is lowered into the water to be tested, and the switches 21 and 22 are closed. Alternating current is applied over leads 12 and 13 from the vibrator power supply to the opposite terminals D and C of the bridge. Current flows between the terminals D and C over two paths, one path including the terminal A and the other path including the terminal B. When the bridge is unbalanced, a difference in potential will exist between the terminals A and B. This potential is applied over leads 28 and 29 to the input electrodes of the amplifier tube 25. The voltage applied to the amplifier tube 25 is an alternating current voltage having a magnitude depending on the degree of unbalance of the bridge. The unbalance signal is amplified by the amplifier tube 25 and is applied over lead 43 to the control electrode of the magic eye tube 24.

The bridge is balanced by moving the sliding contact 41 on resistor 40 until a maximum dark shadow angle indication is provided by the magic eye tube 24. This condition obtains when the ratio of the resistance between A and C and between C and B, consisting of the resistance of the conductivity cell is equal to the ratio of the resistance between A and D and between D and B provided by the resistance network including resistors 33, 34, 35 and the thermistor 8 in the immersion unit 5. With the bridge thus in balance, the pointer knob 41' associated with sliding contact 41 indicates the salinity of the liquid under test on a calibrated dial. The thermistor 8 modifies the resistance in the bridge arm D—B in such a way as to compensate for the variations in conductivity with temperature of the liquid in conductivity cell 6. Therefore, a true indication of salinity is automatically provided regardless of the temperature of the liquid being tested.

When the salinity of the water being tested falls outside the range which conductivity cell number 6 is designed to measure, the six movable contacts of the six-pole three-position switch are moved to the corresponding positions designated 2. This connects conductivity cell number 7 in the bridge arm B—C in place of the conductivity cell 6. The other arms of the bridge circuit are undisturbed electrically. A salinity figure is obtained by balancing the bridge as has been described. The reading taken from the salinity scale associated with the movable contact 41 is multiplied or divided by the predetermined factor to give the correct reading when using the conductivity cell 7. Alternatively, a second calibrated scale may be associated with the movable contact 41 for use with the conductivity cell 7.

When it is desired to measure the temperature of the liquid surrounding the immersion unit 5, the six-pole three-position switch is moved so that the movable contacts engage the stationary contacts designated 3. In this condition, the bridge arm A—C is constituted by a part of resistor 40 and a resistor 44, bridge arm C—B is constituted by the thermistor 8, the bridge arm C—B is constituted by the resistors 45 and 46, and the bridge arm D—A is constituted by the resistor 47 and a part of resistor 40.

The bridge is then balanced by adjusting the sliding contact 41 and a maximum dark shadow indication is provided by the magic eye tube 24. The pointed knob 41' associated with the sliding contact 41 then indicates the temperature of the liquid on a calibrated dial.

It is apparent that according to this invention there is provided a combination conductivity and temperature indicating instrument which serves to indicate both temperature-compensated conductivity and temperature with great accuracy while involving the use of relatively few component parts.

In one embodiment of the invention constructed and satisfactorily tested, one of the conductivity cells has a cell constant of 0.200 and the other a constant of 2.00. The conductivity range is 40–4000 micromhos per cm. referred to 25° C. This is the range when the instrument operates in conjunction with the conductivity cell of lower cell constant. When the switch 30 is thrown into its central or #2 position, the range of the conductivity bridge becomes 400–40,000 micromhos per cm. An inside scale covers a range of 32°–122° F. and this inside scale is read by the operator when the switch 30 is in the right hand or #3 position.

What is claimed is:

1. A combination conductivity and temperature indicating instrument comprising, a resistance bridge having first and second pairs of opposite terminals and including a calibrated adjustable balancing resistor, bridge balance indicator means coupled to said first pair of opposite terminals, means to apply an energizing potential to said second pair of opposite terminals, an immersion unit including a conductivity cell and a temperature-responsive resistor, one arm of said bridge being constituted by said conductivity cell, and another arm of said bridge including said temperature-responsive resistor, whereby temperature-compensated conductivity can be measured, additional resistors, and a multi-pole switch for substituting said temperature-responsive resistor in one arm of said bridge in place of said conductivity cell, and for substituting said additional resistors in the other three arms of said bridge, whereby temperature can be measured.

2. The combination as defined in claim 1, and in addition, a second conductivity cell in said immersion unit, said second cell having a different sensitivity range, and switch means for substituting said second conductivity cell for the first cell in one arm of said bridge.

3. A combination conductivity and temperature indicating instrument comprising, a resistance bridge having first and second pairs of opposite terminals and including a calibrated adjustable balancing resistor, a vacuum tube amplifier having input terminals coupled to said first pair of opposite terminals, a magic eye indicator tube circuit coupled to the output of said amplifier, a battery operated synchronous vibrator power supply having filament and B+ output terminals connected to said amplifier and said indicator tube circuit, and having an alternating current output connected to said second pair of opposite terminals of said bridge, an immersion unit including a conductivity cell and a temperature-responsive resistor, one arm of said bridge being constituted by said conductivity cell, and another arm of said bridge including said temperature-responsive resistor, additional resistors, and a multi-pole switch for substituting said temperature-responsive resistor in one arm of said bridge in place of said conductivity cell and for substituting said additional resistors in the other three arms of said bridge.

4. A combination conductivity and temperature indicating instrument comprising, a resistance bridge having a first pair of opposite terminals A and B and a second pair of opposite terminals C and D, said bridge including a calibrated balancing resistor in arms A—C and A—D with a sliding contact connected to terminal A, said arms A—C and A—D also including additional fixed resistors, an immersion unit including a conductivity cell connected to constitute arm C—B of the bridge, a resistance network constituting bridge arm B—D and including a temperature-responsive resistor in said immersion unit, additional resistors, and a multi-pole switch for substituting said temperature-responsive resistor in arm C—B in place of said conductivity cell and for substituting said additional resistors in the other three arms of said bridge.

5. A combination conductivity and temperature indicating instrument comprising, a resistance bridge having a first pair of opposite terminals A and B and a second pair of opposite terminals C and D, said bridge including a calibrated balancing resistor in arms A—C and A—D with a sliding contact connected to terminal A, said arms A—C and A—D also including additional fixed resistors, an immersion unit including a conductivity cell connected to constitute arm C—B of the bridge, a resistance network constituting bridge arm B—D and including a temperature-responsive resistor in said immersion unit, additional resistors, and a multi-pole switch for substituting said temperature-responsive resistor in arm C—B in place of said conductivity cell and for substituting said additional resistors in the other three arms of said bridge, a vacuum tube amplifier having input terminals coupled to terminals A and B of said bridge, a magic eye indicator tube circuit coupled to the output of said amplifier, a battery operated synchronous vibrator power supply having filament and B+ output terminals connected to said amplifier and said indicator tube circuit, and having an alternating current output connected to terminals C and D of said bridge.

6. A combination conductivity and temperature indicating instrument as defined in claim 5, and in addition, a second conductivity cell in said immersion unit, said second conductivity cell having a different sensitivity range, said multi-pole switch including a third position for substituting said second conductivity cell in bridge arm C—B in place of said first conductivity cell.

7. A combination conductivity and temperature indicating instrument as defined in claim 6 wherein said multi-pole switch is a six-pole three-position switch.

References Cited in the file of this patent

UNITED STATES PATENTS

| | | |
|---|---|---|
| 1,642,525 | Wheeler | Sept. 13, 1927 |
| 2,611,007 | Cade et al. | Sept. 16, 1952 |
| 2,666,164 | Albrecht | Jan. 12, 1954 |